United States Patent [19]

Chen et al.

[11] Patent Number: 5,323,377
[45] Date of Patent: Jun. 21, 1994

[54] ELECTRICAL DATA RECORDING AND RETRIEVAL BASED ON IMPEDANCE VARIATION

[76] Inventors: Zhi Q. Chen; Yi-Hong Chen, both of 5N, Hibben Apt., Faculty Rd., Princeton, N.J. 08540

[21] Appl. No.: 982,616

[22] Filed: Nov. 27, 1992

[51] Int. Cl.$^5$ .................... G11B 9/00; H04R 23/00
[52] U.S. Cl. .................... 369/126; 365/148; 204/281; 205/68
[58] Field of Search .............. 365/148; 369/13, 126; 235/442, 443, 451; 360/110; 204/281; 205/67, 68

[56] References Cited

U.S. PATENT DOCUMENTS

| | | | |
|---|---|---|---|
| 3,511,973 | 5/1970 | Best . | |
| 3,920,930 | 11/1975 | Sobczyk | 179/100.41 T |
| 4,665,504 | 5/1987 | Hockley | 365/163 |
| 4,684,972 | 8/1987 | Owen et al. | 357/59 |
| 5,162,819 | 11/1992 | Sakai | 346/153.1 |
| 5,182,723 | 1/1993 | Yanagisawa | 365/151 |
| 5,187,367 | 2/1993 | Miyazaki | 250/306 |
| 5,204,851 | 4/1993 | Kawada | 369/126 |

OTHER PUBLICATIONS

A. E. Owen, P. G. Le Comber, G. Sarrabayrouse and W. E. Spear; "New amorphous–silicon electrically programmable nonvolatile switching device," IEE Proc. vol. 129 Pt 1, No. 2, Apr. '82.

*Primary Examiner*—William L. Sikes
*Assistant Examiner*—Tiep Nguyen

[57] ABSTRACT

Electrical data is recorded and retrieved by producing and detecting impedance change. A layer of high resistivity material on a conductive substrate is used as the recording layer. A conductive probe pressing on it is used for sending writing or reading electrical current flowing in a direction normal to its surface. A large enough electrical voltage pulse is applied on this probe, causing electro-forming in a data spot in the recording layer under the probe, turning the local resistance of this data spot from high to low. This change in resistance or more generally, change in impedance, is utilized to write data. Several kinds of impedance detecting circuits, utilizing the principle of voltage divider circuit or field effect transistors are employed in data reading. A large number of writing/reading units can be integrated compactly.

20 Claims, 7 Drawing Sheets

ELECTRICAL DATA RECORDING AND RETRIEVAL BASED ON IMPEDANCE VARIATION

FIELD OF INVENTION

This invention relates to data recording and retrieval, utilizing impedance variation in a recording layer, data recorded and retrieved by a writing/reading apparatus which is movable relative to the recording layer.

BACKGROUND OF THE INVENTION

Most of modern mass data recording techniques with writing/reading head movable relative to a recording layer utilize spatial variation in magnetic property or optical property in the recording layer. Some other recording techniques utilize variation of electrical polarization or deposition of static electric charge. Many memory devices utilize change of electrical resistance of some semiconductor or dielectric films, but few mass data recording techniques with writing/reading head movable relative to a recording layer utilize variation of electrical impedance.

As far as we know, one patent, U.S. Pat. No. 3,511,973, which is issued in 1970 to Donald T. Best, aims to utilize impedance change for data recording layer movable relative to some writing/reading apparatus. In this patent, the recording layer is a piece of card, rectangular in shape, having a uniform surface resistivity. On two opposite sides of this rectangular card there are two metal strips in contact with the resistive surface. Data is recorded by altering the resistivity of a data spot in the medium by means of mechanical impact, hot probe, application of a high potential, chemical means or the like. Data is retrieved by applying a potential across the metal strips, creating a nearly uniform current density along the surface of the recording layer and causing the temperature at the surface to rise. At those spots on the recording layer where the resistivity has been changed, the temperature is different from other areas as a whole. The temperature difference is then detected by a scanning thermographic equipment.

There are several disadvantages in Best's patent. The reading current proposed by this patent flows through a series of data spots in the recording layer. As a result, resistance change of one data spot would influence the current flow and the temperature in the data spots in series with this data spot. For example, if the local resistance of a data spot is increased, the data spots in series with it would become cooler because of decrease of current flowing through them, even though there are no resistance changes in these spots. Furthermore, because of thermal conductivity, temperature change in one spot will influent the temperature in its neighborhood. All these make the fine detailed analysis of the data structure difficult.

SUMMARY OF THE PRESENT INVENTION

Another disadvantage of Best's patent is that, the requirement of two metal strips on opposite sides of a rectangular card prohibits the employment of disc shape or other non-rectangular shapes of the recording layer.

The above disadvantages can be avoided if the reading current flows in a direction normal to the surface of the recording layer, instead of along the surface, because the reading current then flows through one data spot at a time. This is one major improvement by our invention. To achieve this, we use as the recording layer a high resistivity material layer on a conductive substrate, with a conductive probe pressing on the high resistivity layer as a writing/reading head. For writing, we send a large enough electrical current pulse flowing from the probe, through a data spot on the high resistivity layer to the conductive substrate, causing electroforming in the high resistivity material on this spot, lowering its resistivity by several orders of magnitude. For reading, we send a reading current pulse flowing from the probe, through the data spot to the conductive substrate, to detect the impedance of the data spot. Since the reading current passes through only one data spot at a time, there will be no problem of interaction among data spots. Moreover, we do not use the two metal strips as in Best's patent, so the recording layer of our invention can be made of any shape.

To summarize, one major difference of our invention from Best's patent is the direction of reading current and hence the reading methods. The direction of the reading current in our invention is normal to the surface of the recording layer while that in Best's patent is tangential to it. These give us a chief advantage in achieving a clear-cut one-to-one correspondence between the data recorded and the data retrieved. Besides, electrical method of detection is also better than the thermal method.

The chief objective of the present invention is to obtain a better resolution through the above mentioned advantages. Another objective is to eliminate the restriction of the rectangular shape of the recording layer. One great advantage of this invention is the very small dimension of the writing and reading head, which makes it possible to integrate a large number of heads in one piece and to process data in parallel. This and other objectives and advantages of our invention would be clear after examining the embodiments of our invention as set forth in the following specification.

BRIEF DESCRIPTION OF THE DRAWING

Specifically,

In FIG. 2 a certain kind of voltage divider circuit is utilized, while in FIGS. 3,4 and 4A certain kinds of active device using the field effect principle of a FET utilized. FIG. 2A illustrates the input pulse shape, while

FIG. 7A is a development view of the surface layer on the substrate in FIG. 7. FIG. 7B is a sectional view cut along the line PP in FIG. 7A.

FIG. 10 A-C illustrate another procedure and tool of electro-forming.

DESCRIPTION OF THE PREFERRED EMBODIMENTS

Figure 1:
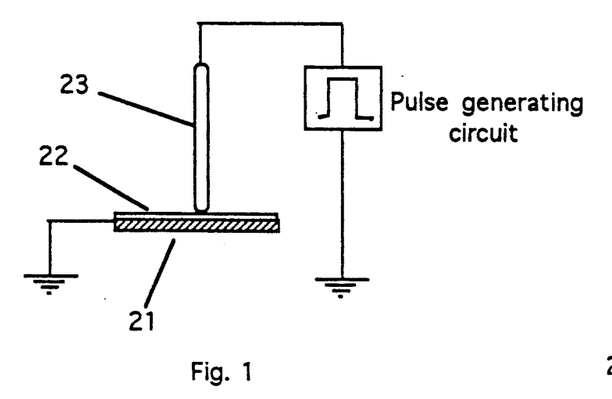
FIG. 1 is a schematic view of the recording layer and the writing apparatus engaging thereon.

Referring to FIG. 1, the recording layer employed in this invention is shown to comprise of a layer of horizontally uniform high resistivity material 22 on a conductive substrate 21. A conductive probe 23, pressing on the high resistivity layer 22, is connected to a pulse generating circuit for the purpose of writing. For a layer of high resistivity material with a thickness not greater than 0.5 μm, an electrical voltage pulse less than 30 volts is enough to induce an electro-forming in a small spot of the high resistivity layer directly under the conductive probe 23. This region, which we call data spot, will be very small if the dimension of the tip of the conductive probe 23 is very small. The resistance of this region will be lowered by several orders of magnitude when electro-forming occurs.

One king of material used in this invention for the high resistivity material is solid dielectric. For a dielectric layer with typical resistivity of $10^{12}$ Ωcm(such as SiO), and thickness of 0.5 μm, and for a conductive probe with end area of 100 μm$^2$, the resistance of the unwritten data spot between the conductive probe and the conductive substrate is $r_0 = 5 \times 10^{13}$ Ω. On the other hand, the resistance of the written data spot will be no greater than 1000 Ω, which is usually the value for the local resistance where electroforming occured. That is to say, the resistance of the unwritten data spot is much larger than that of the written data spot.

Figure 1A:
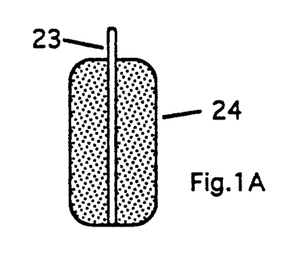
FIG. 1A is a sectional view of one type of the probe used in FIG. 1B is a schematic view of an embodiment similar to that shown in FIG. 1 with a current limiting resistance inserted.

In order to enhance the density of data storage, the tip of the conductive probe can be made very sharp, with radius of micron or even sub micron range. In this case, the tip should be supported or protected in some way to prevent its untimely wear. One way is to clad the conductive probe with a layer of solid dielectric, such as glass, epoxy or the like. FIG. 1A is a sectional view of such a construction, where 24 represents a glass layer surrounding the conductive probe 23. To prevent the surface of the recording layer from indentation or unevenenness, the writing end of the conductive probe together with the glass envelope should be grounded flat before it can be used to contact the recording layer. The hardness of the glass is preferentially matched to that of the conductive probe so that there will be no preferential wear of either of them after prolonged use.

Figure 1B:
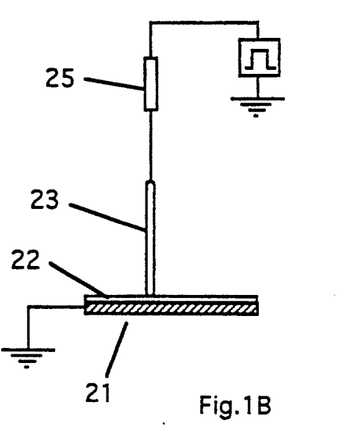

To assure that the current in the later stage of electroforming will not become exceedingly large as to bring forth possible undesired side effects, we can insert a current limiting resistance in series with the conductive probe. This modification is shown in FIG. 1B, where the label 25 represents the inserted current limiting resistance while other labels represent the same as before. The impedance value of this resistance should be much smaller than the impedance value of the unwritten data region so that the applied voltage falls on the data region fully before the occurrence of the electroforming. On the other hand, this impedance value should be larger than that of the written data regions and be so large that no detrimental effect would be produced by the maximum value of current attained in the later stage of electroforming. In reality, if the output impedance of the pulse generating circuit is suitably chosen, it can serve as this current limiting resistance.

Figure 2:
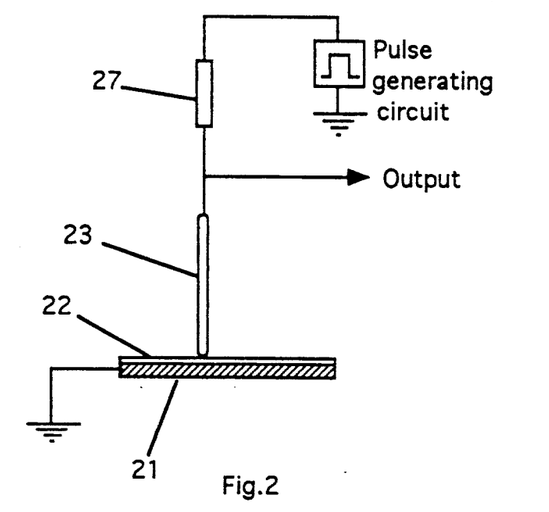
FIGS. 2,3,4, and 4A are diagrams of three embodiments of the reading apparatus.

A probe similar to but sometimes same as that used for writing may be utilized for reading. This is shown in FIG. 2, where the conductive probe 23 is pressing on a data spot in the recording layer and is connected to a kind of impedance detecting circuit. Either in FIG. 1 or in FIG. 2, the current pulse is flowing from the probe, through the data spot directly underneath it to the conductive substrate. The current flows in a direction normal to the surface of the recording layer and passes one data spot at a time. In this case only, the reading apparatus may be the same as the writing apparatus. In all other cases as will be described in the following, we must have both separate writing apparatus and reading apparatus.

Figure 2A:
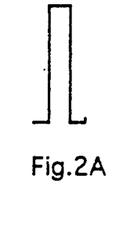
Figure 2B:
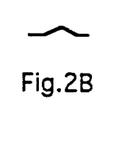
FIGS. 2B and 2C illustrate the output pulse shapes from the reading apparatus shown in FIG. 2, corresponding to the cases that the data spot is written or unwritten respectively.
Figure 2C:
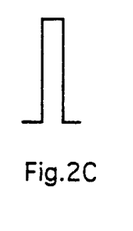

A voltage divider circuit composed of an impedance element 27 and the data spot region underneath the conductive probe 23 is shown in FIG. 2. A direct current pulse is applied across this circuit. If the pulse width $\tau$ and the impedance value of an impedance element 27 were suitably chosen, then the output signal from a point between the impedance element 27 and the conductive probe 23 will be a pulse whose height will assume two different values according to whether the data spot is written or not. For example, let the impedance element 27 be a resistor with resistance R, the unwritten data spot be a dielectric layer sandwiched between the conductive probe and the conductive substrate, thus forming a capacitor of capacitance C. If $RC < \tau$, the electrical potential across the data spot will establish quickly within the pulse period $\tau$, hence output a large pulse. For example, if $\tau = 0.05$ μs, $C = 4.4 \times 10^{-15}$ farad as calculated from a dielectric constant $\epsilon = 2.5$, and R is chosen to be $10^6$ Ω, then RC will be approximately $4.4 \times 10^{-9}$ s, much less than 0.05 μs, the value of $\tau$. If the data spot is written, the resistance of the dielectric layer in this region is lowered. In the case in which the conductive probe makes conductive contact with this low resistance, the electrical potential across the data spot will be very small compared to that across the resistor R, because of the ordinary voltage dividing effect. In the case in which the conductive probe makes no conductive contact with this written data spot but still presses tightly on it, leaving an extremely small gap between them, a large capacitor exists between the conductive probe and the top of the written data spot. Its capacitance C' will be much greater than the capacitance C of the unwritten data spot, because the above mentioned gap is much smaller than the thickness of the data spot. A typical width of this gap will be less than 0.02 μm. In this case, $C' > 1.1 \times 10^{-13}$ farad, and $RC' > 1.1 \times 10^{-7} s > \tau$. The electrical potential across this capacitor will rise so slowly that only a very small voltage can be established within τ. So in this case too, the electrical potential between the conductive probe and the conductive substrate will be very small compared to that across R. So the output signal would be low or high according to whether the data spot is written or not. The above condition can be represented by $RC < \tau < RC'$, which is not hard to fulfill. FIGS. 2A represents the input pulse shape while FIGS. 2B and 2C represent output pulse shapes that correspond to the cases of the data spot having been written and unwritten respectively.

Another technique to detect the impedance is by means of electric field effect. When a certain electrical potential is applied across an insulating layer, the electric field will be inversely proportional to the thickness of the insulating layer. When the potential is applied across two initially insulating layers, then the electric field in one layer will become stronger if the other layer becomes conductive.

Figure 3:
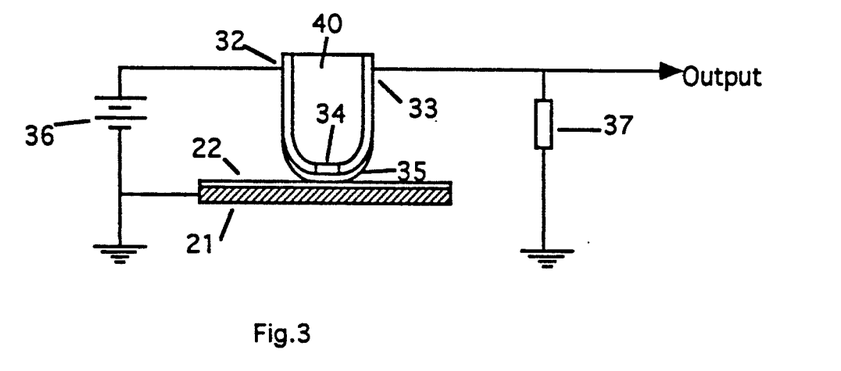

In FIG. 3, the labels 32,33,34 represent the source electrode, the drain electrode and the semiconductor channel of a active device using the field effect principle of a FET. The source and drain electrode 32,33 consist of metal strips. The semiconductor channel 34 is pressed on a data spot. A thin dielectric film 35, called the gate insulation layer, which is deposited on the semiconductor channel 34 in the manufacture procedure is sandwiched between the semiconductor channel and the data spot. The size of this semiconductor channel, of the gate insulation layer and of the data spot should be the same and be about a few micrometers as is determined by the resolution attainable with the present art of photolithography. A certain potential from the voltage source 36 is applied between the source electrode 32 and the conductive substrate 21 of the recording layer. The potential drops along the semiconductor channel 34, the gate insulation layer 35 and the data spot in the high resistivity layer 22 in one branch, and drops along the semiconductor channel 34, the drain electrode 33 and the load impedance 37 in another branch. Consider the first branch, the electric field in the gate insulation layer 35 and on the semiconductor channel 34 will assume high or low value according to whether the data spot is conductive or insulating. Correspondingly, the output current flowing through the load impedance 37 assumes two distinct values respectively, and as a result, two distinctive output signals would be obtained for the written and unwritten cases. In this case, the reading apparatus must be different from the writing apparatus, and the system should have both a writing apparatus and a reading apparatus for the recording and retrieval of data.

In the field effect transistor shown in FIG. 4, there is a gate metal layer 38, also called gate electrode, which is about the same size as the gate insulation layer and is overlaying it, below the semiconductor channel 34. This gate electrode is absent in the active device using the field effect principle of FET shown in FIG. 3. The gate electrode is floating, i.e., isn't connected to anywhere. Because no electric field can exist in the metal layer, this gate metal layer does not influence the discussion about electric field in the last paragraph. There is no difference in operation whether the gate metal layer exists or not. This gate metal layer 38 serves simply as an additional protection layer to the field effect transistor. In certain case, this gate metal layer can be connected to a conductive probe which, in substitute for the gate metal layer, can be pressed directly against the recording layer in the reading process. This is schematically illustrated in FIG. 4A, where 23 represent a conductive probe and the active device using the field effect principle of a FET is represented by a box with source electrode, drain electrode and gate electrode labeled by 32, 33 and 38 respectively.

One great advantage of this invention is the very small dimension of a single writing or reading head. The tip of the above mentioned probe can be made very small, in submicron range. The dimension of the semiconducting channel can be made in the micron range. These make it possible for a large number of writing or reading heads to be integrated in one piece. As a result parallel input or output will be available, shortening the access time simultaneously. This is perhaps the biggest advantage of this invention.

Figure 5:
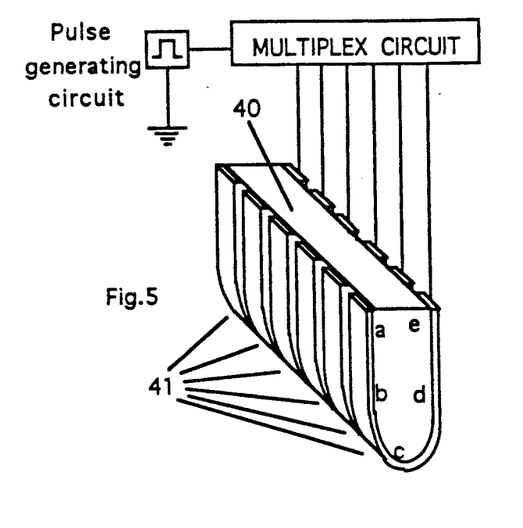
FIG. 5 is a schematic view of a writing apparatus with a plurality of conductive probes integrated in one piece.
Figure 5A:
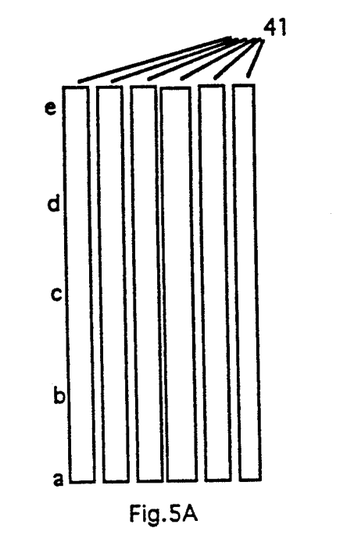
FIG. 5A is a development view of the surface layer on the substrate in FIG. 5.

An integrated writing apparatus is shown in FIGS. 5 and 5A, where label 40 denotes an insulating plate with one end round and the other end rectangular. This insulating plate serves as a substrate for the support of the writing circuit. The construction and manufacturing of this writing apparatus is as follows. On the two flat faces and the curved face on the round end of the plate 40 is coated a layer of metal. Among many possible methods, conventional technique of vacuum deposition with multiple sources can be used for depositing this layer. In case of only one source, turning the plate around would be necessary during the deposition. Conventional laser technique can employed to cut this metal layer into many strips 41, using multiple lasers. In case of only one laser, turning the plate around would be necessary during the cutting. The metal strips are arranged in a row and are connected through a multiplex circuit to a pulse generating circuit. Each of these strips serves as a writing head. FIG. 5A is a development view of the metal layer on the plate 40, along a stretch-out line a, b, c, d, e on the surface contour of the plate 40. The shape of the recording layer is preferably rectangular. Width of the plate 40 may be approximately equal to that of the recording layer. In the writing process, the plate presses on the recording layer with its round end and moves perpendicular to its width and along a side of the recording layer, with each metal strip pressing on a data spot at a time. The multiplex circuit is employed to connect the writing heads to input, for parallel or selective writing. In the special case that there is only one metal strip, this reduces to the non-integrated writing apparatus similar to that described with relation to FIG. 2.

Figure 5B:
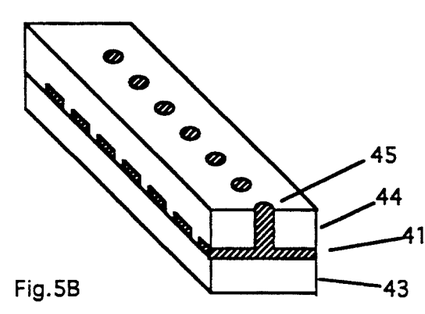
FIG. 5B is a schematic view of a modification of the writing apparatus shown in FIG. 5.

The above described integrated writing apparatus can be modified in form. In FIG. 5B a modified embodiment is shown where metal strips 41 arranged in o row similar to that in FIG. 5 are deposited on one face of a thin dielectric sheet 43. An insulation layer 44 is deposited on top of the metal strips 41. Holes are opened in this insulation layer and metal pins 45 are made by electroplating or other technique and are connected with the metal strips 41 one with one. The tips of these metal pins 45 lie on a same level as the surface of the insulating layer 44. These tips are pressed on the recording layer in the writing process. The operation principle of this modified embodiment is the same as described in connection with FIG. 5. The feature of this modified embodiment is that it can be made very thin, as the thickness of the dielectric sheet 43 and that of the insulating layer 44 can be made very small.

Figure 5C:
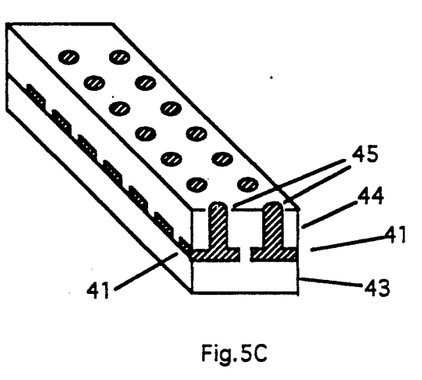
FIG. 5C is similar to FIG. 5B, but the conductive probes are integrated in two dimension.

Besides integration in one dimensional array, we can integrate the writing heads in two dimensional array with many rows of writing heads. One example is shown in FIG. 5C, where two linear arrays of writing heads are integrated in a sheet, similar to that shown in FIG. 5B, where the labels represent the same as that in FIG. 5B.

Figure 6:
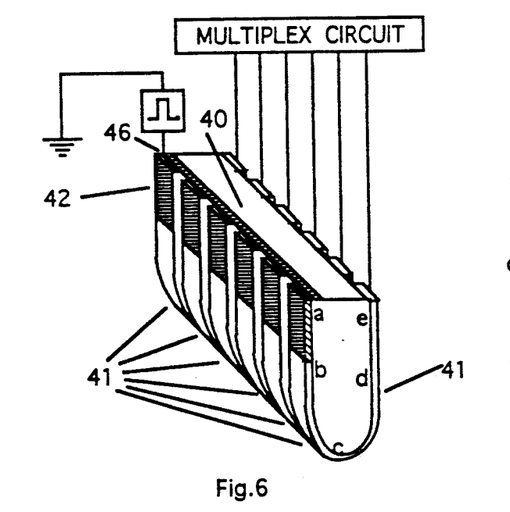
FIG. 6 is a schematic view of an embodiment of reading apparatus with a plurality of voltage divider circuits integrated in one piece.
Figure 6A:
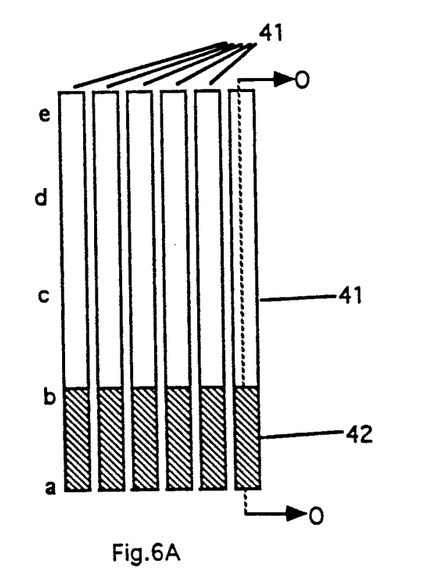
FIG. 6A is a development view of the surface layer on the substrate in FIG.
Figure 6B:
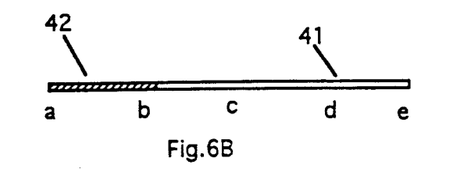
FIG. 6B is a sectional view cut along the line OO in FIG. 6A.

One embodiment of an integrated reading apparatus is shown in FIGS. 6, 6A and 6B. On the surface of an insulating plate similar to 40 in FIG. 5, a multilayer of thin films is deposited and then laser cut into strips, whose development view, along a stretch-out line a, b, c, d, e, is shown in FIG. 6A. A sectional view cut along the line OO in FIG. 6A is shown in FIG. 6B. As shown, 42 are impedance elements formed by high resistivity material whose length and resistivity are tailored to obtain an adequate impedance value lying between that of the written and unwritten data spots. 41 are metal strips for connection use. Another metal strip 46 connects the impedance elements 42 to a pulse generating circuit. In the reading process, the plate presses on the recording layer with its round end scanning along a direction perpendicular to its width and along a side of the recording layer, with each metal strip pressing on one data spot at a time. The operation principle of each strip in this integrated reading apparatus is the same as the reading apparatus shown in FIG. 2. A multiplex circuit is employed to connect these strips to output, for parallel or selective reading. In the special case that there is only one metal strip, this reduces to the non-integrated reading apparatus similar to that described with relation to FIG. 2.

Figure 6C:
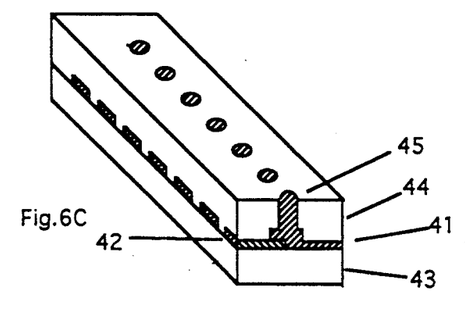
FIG. 6C is a schematic view of a modification of the writing apparatus shown in FIG. 6.

This integrated reading apparatus can also be modified in form. In FIG. 6C, the labels 42 and 41 represent impedance elements and metal strips just as in FIG. 6. Labels 43, 44 and 45 represent dielectric sheet, insulation layer and metal pins similar to that in FIG. 5B. Metal pins 45 are pressed on the recording layer in the reading process and the operation principle is the same as described in connection with FIG. 6.

Figure 7:
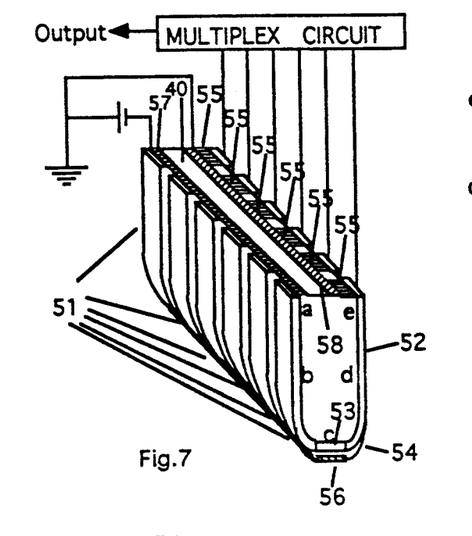
FIG. 7 is a schematic view of an embodiment of reading apparatus with a plurality of active device using the field effect principle of a FET integrated in one piece.

Another embodiment of an integrated reading apparatus utilizing active device using the field effect principle of a FET is shown in FIGS. 7, 7A and 7B. As before, an insulating plate similar to 40 in FIG. 5 is employed as a substrate for supporting the reading area. Thin film deposition, lithography and laser cutting techniques are employed to form strips of thin film active device using the field effect principle of FET. FIG. 7A is the development view of these strips, looking from outside the substrate. FIG. 7B is the sectional view cut along PP in FIG. 7A. Each active device using the field effect principle of a FET is composed of a source electrode 51, a drain electrode 52, a semiconductor channel 53, a gate insulation layer 54 and a floating metal gate electrode 56. All the source electrodes of 51 are connected through a metal strip 57 to a voltage source, while each drain electrode is connected through a load impedance element 55 and another metal strip 58 to ground and through a multiplex circuit to output. In the reading process, the plate presses on the recording layer with its round end scanning along a direction perpendicular to its width and along a side of the recording layer, with each metal gate electrode pressing on one data spot at a time. The operation principle of each strip is the same as that described in connection with the reading apparatus shown in FIG. 4.

Figure 4:
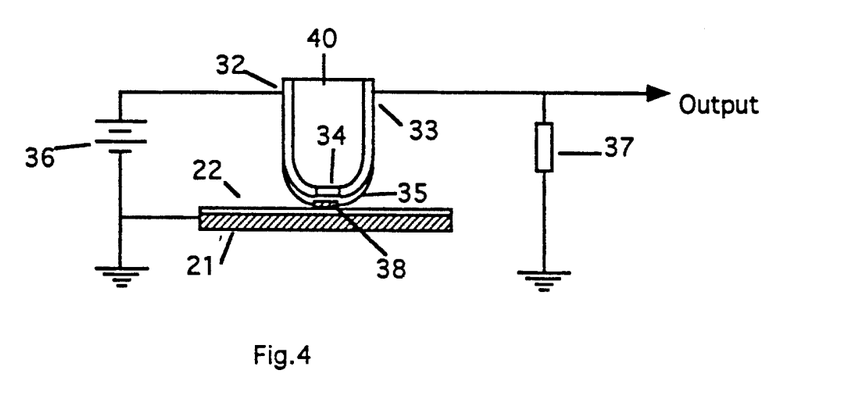
Figure 4A:
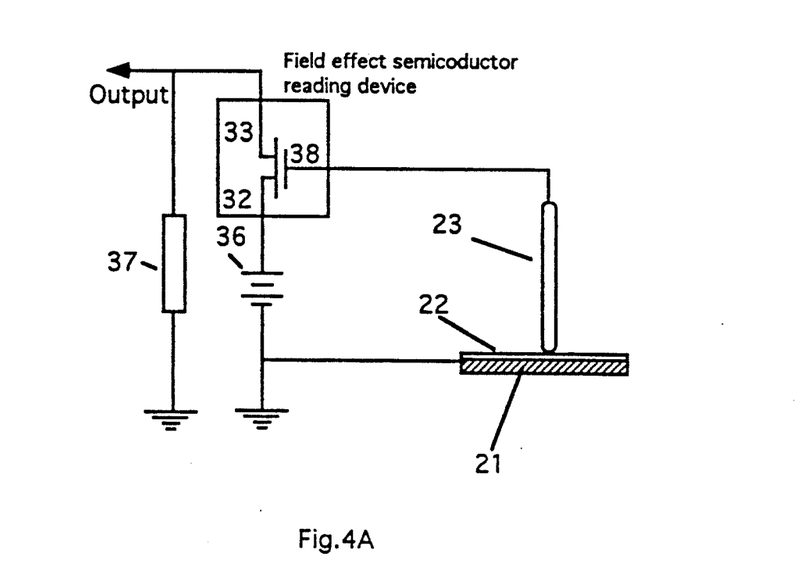

In the special case that there is only one strip, this reduces to the non-integrated reading apparatus as described with relation to FIG. 4.

Figure 7C:
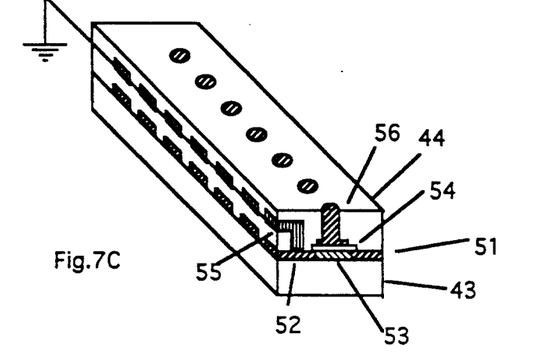
FIG. 7C is a schematic view of a modification of the writing apparatus shown in FIG. 7.

A modified form of the above described integrated reading apparatus is shown in FIG. 7C., where the labels 51, 52, 53, 54, 56 and 55 represent source electrode, drain electrode, semiconductor channel, gate insulation layer, floating metal gate electrode of a active device using the field effect principle of a FET and a load impedance element, just as they represent in FIG. 7. The labels 43 and 44 represent dielectric sheet and insulation layer similar to that in FIG. 5B. The floating gate electrodes 56 are made to protrude from holes opened in the insulation layer 44 to form metal pins, and are pressed on the recording layer in the reading process. The operation principle is the same as described in connection with FIG. 7.

Integration of the reading heads in two dimension is also feasible, similar to that shown in FIG. 5C for an example of the two dimensional integration of writing heads. It is not hard to visualize, FIG. 5C is in fact two FIG. 5B arranged side by side. So, by putting two FIG. 6C side by side, or two FIG. 7C side by side, we can obtain two dimensional integrated reading apparatus.

Figures 8, 8A, 8B:
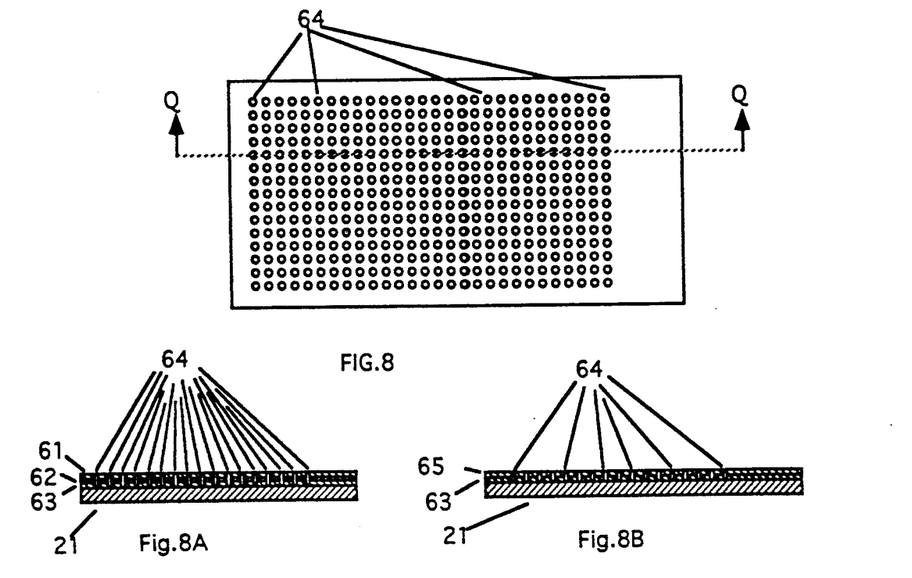
FIG. 8 is the top view of either of two embodiments of erasable recording layer.
FIGS. 8A and 8B are sectional views corresponding to these two embodiments, cut along the line QQ in FIG. 8.

Other embodiments of the recording layer that are erasable are shown in FIGS. 8, 8A and 8B. FIG. 8 is the top view of this recording layer. FIG. 8A and FIG. 8B are sectional views of two embodiments taken along the line QQ in FIG. 8.

In FIG. 8A, there are shown a composite layer consisting of three layers of amorphous silicon having the configuration of i-p-n (for its manufacturing and composition, see Ref. 1: IEE Proc. Vol. 129, Pt. 1, no. 2, April 1982) or three layers of amorphous or microcrystalline silicon containing material, having the configuration i-n-p or n-i-p for its manufacturing and composition, see (Ref. 2: U.S. Pat. No. 4,665,504, May 1987), labeled 61, 62, and 63, on a conductive substrate 21. This composite layer is employed as the recording layer. On this recording layer, there is a two dimensional array of predesigned regions 64. Each region defines a data spot. On each region, we apply an electrical pulse of adequate magnitude and sign to electroform it. As a result, the electroformed region can be switched between a distinctively high and a distinctively low impedance state, by applying voltage pulses of opposite sign and adequate magnitude. Voltage pulse of one sign can be employed in writing while voltage pulse of opposite sign can be employed in erasing. The revelent principle is explained in REF. 1.

Figure 9A:
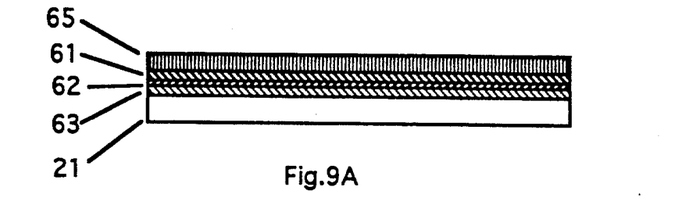
FIG. 9 illustrates a typical procedure of electroforming for the erasable recording layer shown in FIG. 8.
Figure 9B:
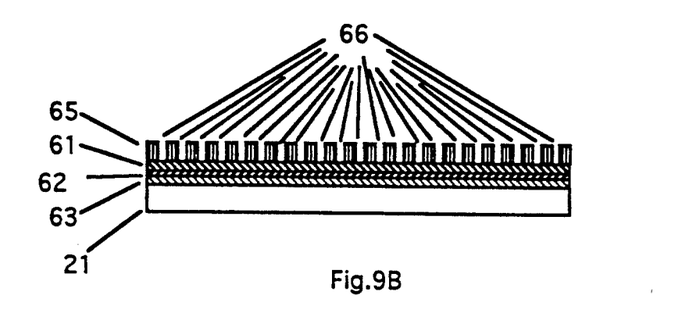
Figure 9C:
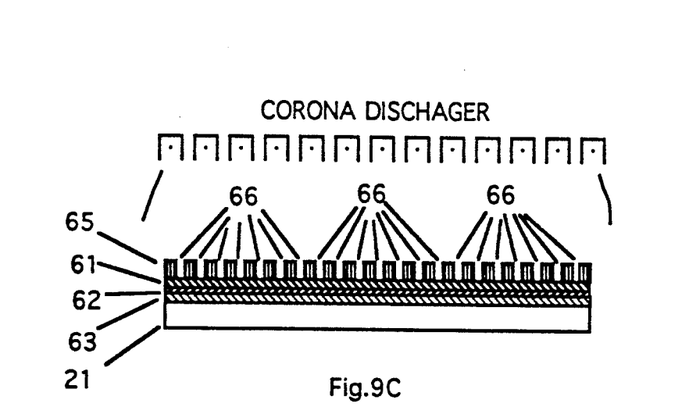
Figure 9D:
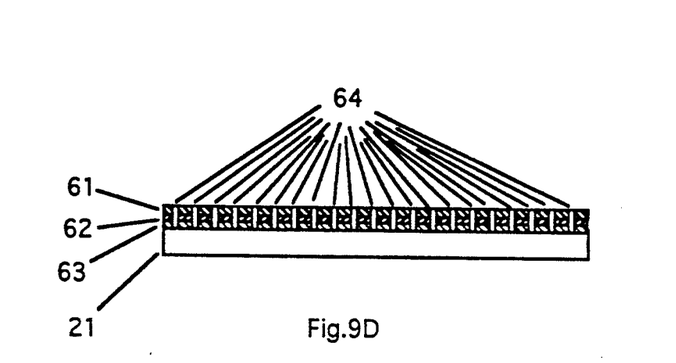

A proposed electroforming procedure for the erasable recording layer is illustrated in FIG. 9A to FIG. 9D. First we coat a layer of photoresist 65 on top of the recording layer, as is shown in FIG. 9A. After patterning and development, an array of holes 66 is opened in the photoresist at the predesigned positions, as is shown in FIG. 9B. The thickness of the photoresist layer 65 should be larger than the total thickness of the three layers 61, 62 and 63. By means of corona discharge, we deposit a layer of electrical charge on the photoresist layer 65 and the array of holes 66, as shown in FIG. 9C. These electrical charges induce an electrical field in the photoresist layer and the amorphous silicon layers 61, 62 and 63. The electrical field in the amorphous layers will be larger in the regions 64 under the holes 66 in the photoresist, than that under the photoresist, because the photoresist is insulating. We chose the density of the charge so that the field under the photoresist is below the threshold for electroforming and the electrical field under the regions 64 is above the threshold. Thus, the predesigned regions 64 will be electroformed and the recording layer will be prepared for writing and erasing, after the photoresist layer is removed, as is shown in FIG. 9D.

In the above mentioned electroforming procedure, we can add a step of depositing a thin metal film on the developed photoresist layer 65 and the holes 66. As a result, the electrical charge deposited afterwards on the metal film will concentrate in the regions 64 under the holes 66, and electroforming will occur in these regions more easily.

Figure 10A:
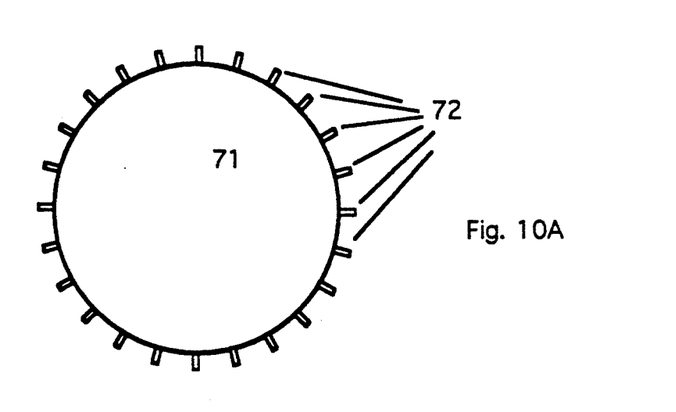
Figure 10B:
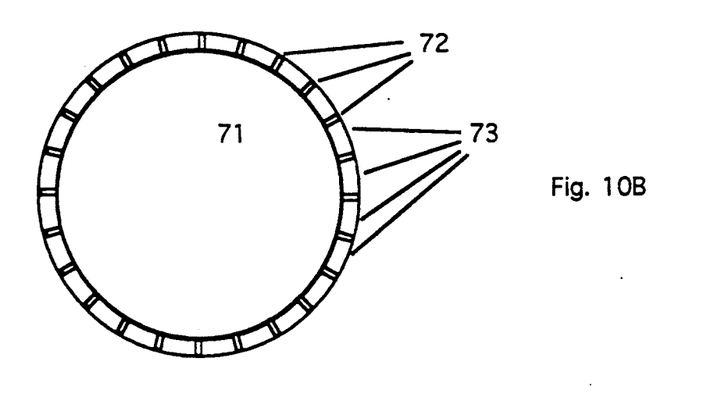
Figure 10C:
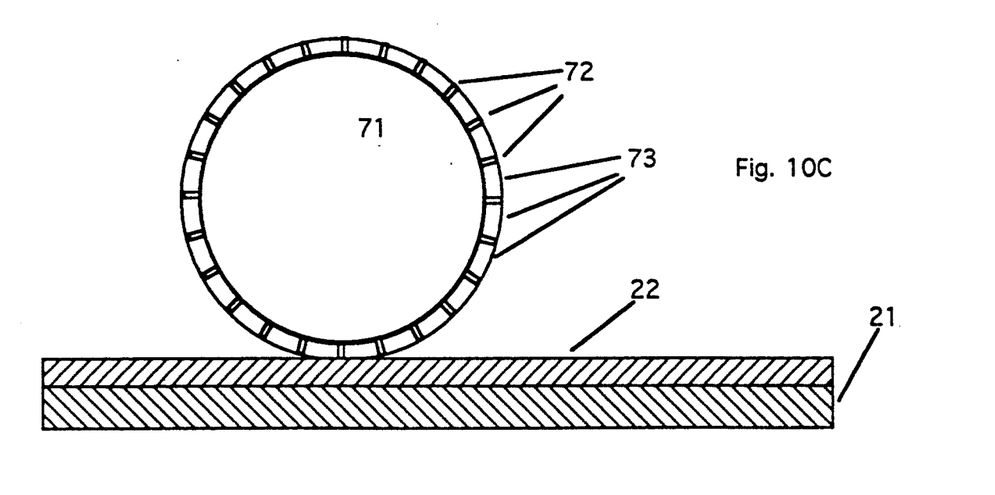

Another electroforming procedure is illustrated in FIGS. 10A-10C. This procedure is similar to the printing procedure in the press. A special tool for electroforming is shown in FIG. 10A. It consists of a metal cylinder 71 with an array of metal pins 72 of a few micrometers in diameter on it. The positions of these metal pins 72 are predesigned. These metal pins are fabricated by means of conventional photolithography and related technology. In FIG. 10B, a tool as in FIG. 10A further comprises a layer 73 of glass or other dielectric materials filling the gaps between the metal pins 72. This layer 73 is used to mechanically strengthen the metal pins 72, which should be sharp and thin. The outer surface of this layer 73 and the tips of the metal pins 72 should lie on a cylindrical surface, in order to minimize unevenness or preferential wear, to keep the surface of the recording layer smooth after electroforming. The electroforming procedure is illustrated in FIG. 10C. The tool as shown in either FIG. 10A or FIG. 10B is pressed against the recording layer 22. An electrical potential difference is applied between the metal pins 72 and the conductive substrate 21 of the recording medium. If the magnitude and the sign of the applied potential difference are adequate, the region on the recording layer underneath the metal pins 72 will be electroformed, but not elsewhere. The metal pins 72 can be made of resistive material so that each metal pin can serve as a current limiting resistance, to prevent the current passing through an individual electroformed data region from being exceedingly large, as discussed in connection with FIG. 1B.

In the embodiment shown in FIG. 8B, in substitute for the three layers in FIG. 8A, there are only two layers of semiconducting material. These are two layers of amorphous silicon having the configuration p$^-$-n (Ref. 1) or two layers of amorphous or microcrystalline silicon containing material having the configuration i-p, i-p$^+$, n-p or n-p$^+$(Ref. 2). The properties and use of this embodiment is the same as that shown in FIG. 8A.

While various embodiments of the invention have been illustrated herein, it will be appreciated that variations and modifications thereof, within the scope of the invention, will become apparent to those skilled in the art. It is clear from the above discussions that any high resistivity layer can be employed as a nonerasable recording layer, provided its resistivity will be significantly lowered by applying a large enough voltage pulse, inducing a process called electro-forming process, such as in the case of antifuse technique. So besides solid dielectric, layer or composite layer of semiconducting materials or composite layer of semiconductor and dielectric materials having high resistivity, will serve the same purpose. It is also clear that any such above mentioned layer having two distinctively different resistivity states switchable from one to the other by applying two distinctively different kinds of voltage pulse, such as the chalcogenide semiconductor layer employed in the ovonic memory devices, will serve as an erasable recording layer. As to the reading apparatus, any circuit that can distinguish between high and low impedance states of the data spot can serve as the impedance detecting circuit for data reading. Moreover, method of integration of the writing/reading heads is not limited to one dimensional array, two dimensional array is also conceivable. Accordingly, the foregoing description should be taken as illustrative and not in a limiting sense.

In summary, the method of data recording and retrieval comprising the following steps: (a) addressing a conductive probe on a data spot in a piece of recording layer that comprises a conductive substrate and a layer of horizontally uniform high resistivity material on said conductive substrate, pressing said conductive probe on said recording layer being allowed in said addressing, (b) applying an electrical voltage pulse between said conductive substrate and said conductive probe, thereby altering the impedance of said data spot sandwiched between said conductive probe and said conductive substrate and thereby, (c) recording data on said data spot in said recording layer, (d) addressing and making electrical coupling on said data spot in said recording layer with a probe comprising a circuit utilizing impedance detecting technique, pressing said probe on said recording layer being allowed in said addressing, (e) sending a reading current in a direction normal to the surface of said recording layer from said probe to said conductive substrate through said data spot, thereby (f) obtaining an output signal reflecting the impedance change of said data spot in said recording layer.

We claim:
1. A data recording and retrieval system comprising,
  (a) a conductive substrate with uniform thickness,
  (b) a recording layer of horizontally uniform high resistivity material being supported on one surface of said conductive substrate,
  (c) a writing apparatus for recording data upon said recording layer comprising,
    (i) a conductive probe for electrically engaging said recording layer, having a tip with an area of a few $\mu m^2$ or larger.
    (ii) means for sending electrical current pulse from said conductive probe to said conductive substrate, through a data spot directly underneath said conductive probe in said recording layer, thereby altering an impedance of said data spot,
  (d) a reading apparatus for retrieval of data recorded on said data spot in said recording layer comprising,
    an impedance detecting circuit for obtaining signals reflecting the relative impedance of said data spot.
2. The data recording and retrieval system of claim 1, wherein said impedance detecting circuit comprises an impedance element to be serially coupled with said data spot in said recording layer, thus forming a voltage divider circuit, said impedance detecting circuit having a pulse generating circuit as input.
3. The data recording and retrieval system of claim 1, wherein said impedance detecting circuit comprises an active device using a field effect principle of a FET with gate insulation layer but no metal gate electrode, said gate insulation layer pressing tightly on the recording layer, a first electrical voltage being applied between a source electrode and a drain electrode of said active device using the field effect principle of a FET, producing a source-to-drain current flowing through a semiconductor channel between said source and said drain electrode, a second electrical voltage being applied between said source and said conductive substrate, thereby inducing different currents in said source-to-drain current according to the different impedance values of said data spot in said recording layer.

4. The data recording and retrieval system of claim 1, wherein said impedance detecting circuit comprises an active device using a field effect principle of a FET with a gate insulation layer and a gate metal electrode, said gate metal electrode being of a size approximately equal to that of a data spot and being pressed tightly on a data spot in said recording layer, a first electrical voltage being applied between a source and a drain electrodes of said active device using the field effect principle of a FET, producing a source-to-drain current flowing through a semiconductor channel between said source electrode and said drain electrode, a second electrical voltage being applied between said source electrode and said conductive substrate, thereby inducing different source-to-drain currents according to different impedance values of said data spot in said recording layer.

5. The data recording and retrieval system of claim 1, wherein said writing apparatus includes a plurality of said conductive probes.

6. The data recording and retrieval system of claim 1, wherein said writing apparatus includes a plurality of said probes, said reading apparatus includes a plurality of said impedance detecting circuits.

7. The data recording and retrieval system of claim 1, wherein said recording layer consist of a composite layer having a configuration chosen from a group containing i-p-n layers of amorphous silicon, i-n-p and n-i-p layers of amorphous silicon containing material, i-n-p and n-i-p layers of microcrystalline silicon containing material, p$^-$-n layers of amorphous silicon, i-p, n-p, i-p$^+$ and n-p$^+$ amorphous silicon containing material, and i-p, n-p, i-p$^+$ and n-p$^+$ microcrystalline silicon containing material, an array of predesigned regions on said recording layer being electroformed by passing through each said region an electrical current pulse of adequate magnitude and sign, with an apparatus similar to said writing apparatus for erasing recorded data by applying between said conductive probe and said conductive substrate an electrical voltage pulse of sign opposite to that for writing.

8. The data recording and retrieval system of claim 1, wherein said recording layer consist of a composite layer having a configuration chosen from a group containing i-p-n layers of amorphous silicon, i-n-p and n-i-p layers of amorphous silicon containing material, i-n-p and n-i-p layers of microcrystalline silicon containing material, p$^-$-n layers of amorphous silicon, i-p, n-p, i-p$^+$ and n-p$^+$ amorphous silicon containing material, and i-p, n-p, i-p$^+$ and n-p$^+$ microcrystalline silicon containing material, an array of predesigned regions on said recording layer being electroformed by first coating said recording layer with a layer of photoresist, opening holes in said photoresist layer at predesigned regions by means of patterning and development, depositing a layer of electrical charge by means of coronic discharge on said recording layer, with an apparatus similar to said writing apparatus for erasing recorded data by applying between said conductive probe and said conductive substrate an electrical voltage pulse of sign opposite to that for writing.

9. The data recording and retrieval system of claim 1, wherein said recording layer consist of a composite layer having a configuration chosen from a group containing i-p-n layers of amorphous silicon, i-n-p and n-i-p layers of amorphous silicon containing material, i-n-p and n-i-p layers of microcrystalline silicon containing material, p$^-$-n layers of amorphous silicon, i-p, n-p, i-p$^+$ and n-p$^+$ amorphous silicon containing material, and i-p, n-p, i-p$^+$ and n-p$^+$ microcrystalline silicon containing material, an array of predesigned regions on said recording layer being electroformed by first pressing on which an array of metal pins at predesigned positions on a cylinder and applying between said metal pins and said conductive substrate under said predesigned regions on said recording layer an electrical pulse of adequate magnitude and sign, with an apparatus similar to said writing apparatus for erasing recorded data by applying between said conductive probe and said conductive substrate an electrical voltage pulse of sign opposite to that for writing.

10. The data recording and retrieval system of claim 1, wherein said recording layer consist of a composite layer having a configuration chosen from a group containing i-p-n layers of amorphous silicon, i-n-p and n-i-p layers of amorphous silicon containing material, i-n-p and n-i-p layers of microcrystalline silicon containing material, p$^-$-n layers of amorphous silicon, i-p, n-p, i-p$^+$ and n-p$^+$ amorphous silicon containing material, and i-p, n-p, i-p$^+$ and n-p$^+$ microcrystalline silicon containing material, an array of predesigned regions on said recording layer being electroformed by first pressing on which an array of metal pins at predesigned positions on a cylinder with the tips of said metal pins on the same cylindrical surface of a solid dielectric layer filling the gaps between said metal pins, and applying between said metal pins and said conductive substrate under said predesigned regions on said recording layer an electrical pulse of adequate magnitude and sign, with an apparatus similar to said writing apparatus for erasing recorded data by applying between said conductive probe and said conductive substrate an electrical voltage pulse of sign opposite to that for writing.

11. A method of data recording and retrieval comprising the following steps,
   (a) addressing a conductive probe having a tip with an area of about a few $\mu m^2$ or larger, on a data spot in a piece of recording layer that comprises a conductive substrate and a layer of horizontally uniform high resistivity material on said conductive substrate, pressing said conductive probe on said recording layer being allowed in said addressing,
   (b) applying an electrical voltage pulse between said conductive substrate and said conductive probe, thereby altering an impedance of said data spot sandwiched between said conductive probe and said conductive substrate and thereby,
   (c) recording data on said data spot in said recording layer,
   (d) addressing and making electrical coupling on said data spot in said recording layer with a probe comprising a circuit utilizing impedance detecting technique, pressing said probe on said recording layer being allowed in said addressing,
   (e) sending a reading current in a direction normal to a surface of said recording layer from said probe to said conductive substrate through said data spot, thereby (f) obtaining output signal reflecting an impedance change of said data spot in said recording layer.

12. The method of data recording and retrieval of claim 11, wherein said impedance detecting technique comprises coupling an impedance element to said data spot in said recording layer, applying on an end of said impedance element farther away from said data spot a voltage pulse from a pulse generating circuit, picking out from another end of said impedance element closer to said data spot pulse signal which reflects the impedance change of said data spot in said recording layer.

13. The method of data recording and retrieval of claim 11, wherein said impedance detecting technique comprises, utilizing an active device using a field effect principle of a FET, applying a first electrical voltage between a source electrode and a drain electrode of said active device using the field effect principle of a FET, thereby producing a source-to-drain current flowing through a semiconductor channel between said source electrode and said drain electrode, applying a second electrical voltage between said source electrode and said conductive substrate, thereby inducing different source-to-drain currents according to different impedance values of said data spot in said recording layer.

14. The data recording and retrieval method of claim 11, wherein said impedance detecting technique comprises utilizing an active device using a field effect principle of a FET with a gate electrode being about a size of said data spot in said recording layer, pressing said gate electrode tightly on said data spot, applying a first electrical voltage between a source electrode and a drain electrode of said active device using the field effect principle of a FET, thereby producing a source-to-drain current flowing through a semiconductor channel between said source electrode and said drain electrode, applying second electrical voltage between said source electrode and said conductive substrate, thereby inducing different source-to-drain currents according to different impedance values of said data spot in said recording layer.

15. The data recording and retrieval method of claim 11, wherein steps (a),(b),(c) as a set of recording steps are to be multiplied by utilizing a plurality of said conductive probes, steps (d),(e),(f) as a set of retrieval steps are to be multiplied by utilizing a plurality of impedance detecting circuits used in said impedance detecting technique.

16. The data recording and retrieval method of claim 11, wherein said recording layer comprises a composite layer having a configuration chosen from a group containing i-p-n layers of amorphous silicon, i-n-p and n-i-p layers of amorphous or microcrystalline silicon containing material, i-p, n-p, i-p+ and n-p+ amorphous or microcrystalline silicon containing material, further comprising a step of electroforming on said recording layer consisting of,
(a) coating a photoresist layer on said recording layer,
(b) opening holes in said photoresist layer at predesigned regions by means of conventional photolithography technology,
(c) depositing a layer of electrical charge on said coated recording layer by means of corona discharge,
(d) removing said photoresist layer.

17. The data recording and retrieval method of claim 11, wherein said recording layer comprises a composite layer having a configuration chosen from a group containing i-p-n layers of amorphous silicon, i-n-p and n-i-p layers of amorphous or microcrystalline silicon containing material, i-p, n-p, i-p+ and n-p+ amorphous or microcrystalline silicon containing material, further comprising a step of electroforming on said recording layer consisting of,
(a) pressing on said recording layer an array of metal pins at predesigned positions on a cylinder, and
(b) applying between said metal pins and said conductive substrate under said predesigned regions on said recording layer an electrical pulse of adequate magnitude and sign.

18. The data recording and retrieval method of claim 11, wherein said recording layer comprises a composite layer having a configuration chosen from a group containing i-p-n layers of amorphous silicon, i-n-p and n-i-p layers of amorphous or microcrystalline silicon containing material, i-p, n-p, i-p+ and n-p+ amorphous or microcrystalline silicon containing material, further comprising a step of electroforming on said recording layer consisting of,
(a) pressing on said recording layer an array of metal pins at predesigned positions on a cylinder, with tips of said metal pins on a same cylindrical surface of a solid dielectric layer filling gaps between said metal pins and,
(b) applying between said metal pins and said conductive substrate under said predesigned regions on said recording layer an electrical pulse of adequate magnitude and sign.

19. A reading apparatus, for retrieval of data recorded in a recording layer of horizontally uniform high resistivity material being supported on one surface of a conductive substrate, comprising,
(a) an insulating plate,
(b) supported on said insulating plate at least one active device using a field effect principle of a FET comprising a source electrode, a drain electrode, a semiconductor channel being about a size of a data spot in said recording layer and a gate insulating layer covering said semiconductor channel, said semiconductor channel being pressed on said data spot during a reading process while a first electrical voltage is applied between said source electrode and said drain electrode to produce a source-to-drain current, a second electrical voltage is applied between said source electrode and said conductive substrate of said recording layer to induce different source-to-drain currents reflecting different resistive values of said data spot in said recording layer.

20. The reading apparatus of claim 19, wherein each said active device using the field effect principle of a FET further comprises a gate metal layer overlaying said gate insulation layer of said active device using the field effect principle of a FET.

* * * * *